United States Patent [19]

Day

[11] 4,229,503
[45] Oct. 21, 1980

[54] COATING UNCURED CEMENTITIOUS ROOFING TILES

[75] Inventor: Henry Day, Sydney, Australia

[73] Assignee: Monier Limited, Chatswood, Australia

[21] Appl. No.: 812,969

[22] Filed: Jul. 5, 1977

[30] Foreign Application Priority Data

Jul. 5, 1976 [AU] Australia ............................. PC6533
Oct. 20, 1976 [AU] Australia ............................. PC7799

[51] Int. Cl.² .......................... D06N 7/04; B05D 3/02; B32B 13/12
[52] U.S. Cl. ............................ 428/451; 260/23 AR; 260/23 XA; 260/29.6 R; 260/29.6 PM; 264/42; 264/48; 264/129; 264/131; 427/314; 427/424; 427/429; 428/411; 428/522; 428/539; 526/213; 526/216; 427/393.5
[58] Field of Search .................. 264/42, 48, 129, 131, 264/256, 133; 427/385 C, 314, 424, 429; 162/154; 260/23 XA, 23 AR, 29.6 R, 29.6 PM; 526/213, 216; 428/142, 147, 500, 522, 451, 539, 522, 411

[56] References Cited

U.S. PATENT DOCUMENTS

| | | | |
|---|---|---|---|
| 2,778,283 | 1/1957 | Bettoli et al. | 162/154 |
| 3,027,294 | 3/1962 | Bettoli et al. | 162/154 |
| 3,085,907 | 4/1963 | Zdanowski et al. | 427/385 C |
| 3,986,994 | 10/1976 | Teer et al. | 260/23 AR |
| 4,036,839 | 7/1977 | Plunguian et al. | 264/256 |
| 4,134,956 | 1/1979 | Suzuki et al. | 264/256 |

FOREIGN PATENT DOCUMENTS

| | | | |
|---|---|---|---|
| 463892 | 1/1974 | Australia | 427/385 C |
| 2526283 | 12/1976 | Fed. Rep. of Germany | 427/385 C |
| 1473308 | 5/1977 | United Kingdom | 427/385 C |

*Primary Examiner*—Ronald H. Smith
*Assistant Examiner*—Thurman K. Page
*Attorney, Agent, or Firm*—Arnold, White & Durkee

[57] ABSTRACT

An uncured cementitious substrate may be coated by a method which comprises applying to the substrate an aqueous emulsion of a film-forming polymeric material, wherein the emulsion contains at least one soluble soap.

8 Claims, No Drawings

COATING UNCURED CEMENTITIOUS ROOFING TILES

This invention relates to the coating of cementitious substrates with polymeric materials. In particular, it relates to the coating of an uncured cementitious surface with polymeric material. In one preferred embodiment, the invention relates to the manufacture of cement roof tiles having a polymeric coating. Although the invention will be described herein primarily with reference to the manufacture of roof tiles, it should be understood that the invention is not limited to the manufacture of tiles, but may also be used in the manufacture of other building elements, of concrete slabs, of cement rendered walls, and a wide variety of other uses.

Concrete roof tiles are commonly made either by a process of pressing or a process of extrusion, both of which processes are well known. The extrusion process is in general use today since it provides better efficiency by producing more tiles per unit of time.

To cater for consumer demand for tiles having a variety of colours, it is usual to coat cement tiles immediately after their formation with a cement slurry containing a pigment which gives the face of the tile its desired colour. Such a coating is described as a "colour coat". It is also know to apply a polymeric coating over the colour coat to give the tile a more pleasing, shiny surface, and to prevent deterioration of the tile through weathering and through efflorescence which takes place when unprotected colour coat is attacked by atmospheric carbon dioxide and water. Such polymeric coatings have previously been applied as a solution of polymer (such as acrylic esters) in an organic solvent. The use of such solutions has two major drawbacks. The first is that the solvents employed are expensive and contribute significantly to the cost of producing the finished tile. Secondly, these solvents evaporate into the atmosphere where they can cause pollution problems and constitute a fire hazard.

Since polymeric coating materials generally, and acrylic polymers in particular, are readily obtainable in the form of water based emulsions, it would be desirable to employ such water based emulsions for the purpose of applying polymeric coatings to roof tiles and other cementitious substrates. In spite of the benefits which might be expected from the avoidance of organic solvents, previous attempts to apply emulsion coatings to uncured cement slurries of the type previously referred to on a commercial scale have proved unsuccessful.

Tile extrusion machines in commercial use today turn out from 60 to 130 tiles per minute. Standard tiles are 16 inches (about 40 cm) long. Thus, any delay in applying the various coatings to the tile necessitates a production line whose length increases by from 80 to 175 feet (about 26 to 57 meters) for every minute taken in applying the various coatings. It follows that in the commercial production of tiles, it is economically essential that the colour coat and the polymeric coat be applied almost immediately after the tile is formed.

If a polymer emulsion is applied directly on to an uncured cementitious layer (for example a layer which has aged less than five minutes), it has been found that calcium hydroxide formed on the hydration of the cement in the colour coat migrates to the outer surface of the polymer emulsion layer, where it reacts with atmospheric carbon dioxide. This reaction destroys the water repellent properties of the coating, and also ruins its appearance, producing an unsightly film of calcium carbonate.

It is an object of the present invention to provide a method for applying a polymer emulsion coating over an uncured cementitious surface such as a colour coat, preferably within a matter of seconds of the application of the colour coat itself, while avoiding the problems just described.

It is a further object of the present invention to provide a polymer emulsion composition which may be applied to an uncured cementitious surface while avoiding the aforesaid problems.

According to one aspect of the present invention, a polymeric coating is applied by using an emulsion of a polymer in water to which has been added a small quantity of a soap. The present inventor has discovered that the presence of the soap in the emulsion overcomes the problems previously discussed, apparently by preventing the migration of calcium hydroxide to the polymeric layer. It is believed that the calcium hydroxide formed by hydration of the cement in the colour coat layer reacts with the soap to form a calcium soap whose insolubility in the emulsion layer prevents the formation of any scum or the deterioration of the polymeric layer.

The invention has utility with a variety of polymer emulsions but the preferred polymer emulsions are emulsions of acrylic polymers of the type presently employed (in organic solutions) to coat roof tiles. Preferred emulsions are polymers of acrylate and methacrylate esters which may or may not have undergone some degree of cross linking with other compounds. The types of coumpounds used for this purpose are well known to those in the industry; typical examples being acrylic acid and glycidyl methacrylates.

Other polymers which may be employed include vinyl ester homopolymers (such as polyvinyl acetate); vinyl ester co-polymers such as acetate versatate and acetate itaconate co-polymers; co-polymers of styrene and acrylate and/or methacrylate esters; polyvinyl chloride; polyvinylidene chloride; co-polymers of vinyl chloride and vinylidene chloride; co-polymers of vinyl chloride and/or vinylidene chloride with acrylate and/or methacrylate esters.

One polymer emulsion which gives particularly satisfactory results contains methyl methacrylate and butyl acrylate in the ratio of 55 to 45 and has a total non-volatile content of 50% by weight.

Soaps which may be employed in the practice of the invention include the lithium, sodium, potassium, and ammonium soaps of carboxylic acids of the general formula R—COOH where R is an alkyl chain, branched or unbranched, saturated or unsaturated, and hydroxylated carboxylic acids such as ricinoleic acid or hydroxy stearic acid, containing from 4 to 20 carbon atoms (usually described as fatty acids); lithium, sodium, potassium and ammonium soaps of "rosin acids" such as abietic acid; di-carboxylic acids including "dimer acids" and "trimer acids"; and oxygenated acids such as the naphthenic acid of commerce. One soap which gives highly satisfactory results is the potassium soap of the coconut oil fatty acids whose fatty acid constituents are lauric acid and myristic acid, with lesser quantities of palmitic, caprylic, capric, oleic, stearic, linoleic and caproic acids. Another soap which gives highly satisfactory results is the potassium soap of palmitic acid. Yet another soap which gives suitable results and is readily available is the potassium soap of tall oil, a by-product of the paper industry. The soap should be added to the emulsion in the appropriate amounts to give the desired observable effect. Typically, the soap is added to the polymer emulsion in the proportion from 0.2 to 10 parts of soap per hundred parts of polymer in the emulsion. The soap may most conveniently be incorporated as an aqueous solution.

The solids content of the emulsion is not critical, but is preferably such that the total non-volatile content is between 20% and 60% by weight. In practice, it has been found desirable to use an emulsion of the highest solids content which can conveniently be handled.

DESCRIPTION OF THE PREFERRED EMBODIMENT

The present invention may be performed as a final step in the extrusion process which is generally practiced today for the formation of concrete tiles. As in conventional concrete tile extrusion processes, concrete is first deposited by extrusion on to metal pallets. The metal pallets not only provide the support for the tiles during formation and curing but also provide a means of shaping the underside configuration of the tiles.

The tile machine is part of a closed conveyor circuit which receives a stream of metal pallets. As the pallets are propelled through the machine, a release agent is sprayed on to the upper surface of each pallet. During the forward movement of both pallet and deposited concrete, a power driven roller is engaged. This roller primarily reduces the concrete to a partly compacted ribbon lying on the stream of pallets. Running against the outgoing surface of the roller is a wedge-shaped plate known as a slipper. The ribbon of concrete is thus trapped, and during the forward movement of the pallet stream and the ribbon of concrete, both roller and slipper impart the desired contour to the top surface of the tile. A cross configuration guillotine knife divides the ribbon at each pallet joint into the separate tiles.

The cut tiles, still in stream, then pass under the surface finishing device which applies the "colour coat" in the form of a coloured cementitious slurry. Although it is not essential to do so, the cut tiles may be heated immediately before the colour coat is applied. It is believed that such heating has the effect of partially drying the colour coat as soon as it is applied, by withdrawing moisture into the body of the tiles.

Within seconds of applying the colour coat, the cut tiles pass through a coating zone at which a polymer emulsion containing a soap according to the invention is applied. The polymer emulsion may be applied by any suitable means, such as a spray or a rotary brush. Such means have previously been employed for coating tiles with organic polymer solutions.

It has been found advantageous to employ some means of drying the emulsion immediately after its application. This may be achieved, for example, by means of a hot air blower, or by infrared or microwave radiation. It has been found that such accelerated drying enhances the water repellency of the polymer coating, and it is believed that this is a result of the quicker breaking of the emulsion under forced drying.

In one embodiment of the invention, an improved polymeric coating may be obtained by the application of heat to the colour coat immediately before the emulsion coating is applied. Such heating may be achieved by means of a hot air blower, by infrared or microwave radiation, or by other suitable means. It is believed that heating at this stage promotes more rapid breaking of the emulsion, possibly by partial drying of the colour coat which consequently draws water from the emulsion.

The claims defining the invention are as follows:

1. A method of coating an uncured cementitious roofing tile comprising applying to said tile an aqueous emulsion of a filmforming polymeric material; wherein said emulsion contains at least one soluble soap, in addition to an emulsifier, in an amount from about 0.2 to about 10 parts per hundred parts by weight of polymer in the emulsion.

2. A method according to claim 1, wherein said soap is present in an amount of from 0.2 to 10 parts per hundred parts by weight of polymer in the emulsion, and is selected from the group consisting of the lithium, sodium, potassium and ammonium soaps of acids from the group consisting of carboxylic acids of the general formula R—COOH where R is a saturated or unsaturated, branched or unbranched, alkyl chain, hydroxylated carboxylic acids containing from 4 to 20 carbon atoms, rosin acids, di-carboxylic acids and oxygenated acids.

3. A method according to claim 2 wherein said soap is selected from the group consisting of lithium, sodium, potassium and ammonium soaps of fatty acids.

4. A method according to claim 1, wherein said polymeric material is selected from the group consisting of acrylic polymers, vinyl ester homopolymers and co-polymers, co-polymers of styrene with acrylate and methacrylate esters, polyvinyl chloride, polyvinylidene chloride, co-polymers of vinyl chloride and vinylidene chloride, and co-polymers of vinyl chloride and vinylidene chloride with acrylate and methacrylate esters.

5. A method according to claim 4, wherein said emulsion has a total non-volatile content of from 20% to 60% by weight.

6. A method according to claim 5, wherein said polymeric material comprises a polymer of acrylate and methacrylate esters.

7. A method according to claim 1, wherein said cementitious tile comprises a concrete outer surface.

8. A method according to claim 6, wherein said esters have undergone some degree of crosslinking with other compounds.

* * * * *